(12) United States Patent
Sensui (10) Patent No.: US 6,292,629 B1
(45) Date of Patent: Sep. 18, 2001

(54) INDICATOR PROVIDED WITHIN FINDER FOR SINGLE LENS REFLEX CAMERA

(75) Inventor: Takayuki Sensui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,358

(22) Filed: Dec. 22, 1999

(30) Foreign Application Priority Data

Dec. 24, 1998 (JP) .................................. 10-368176
Dec. 24, 1998 (JP) .................................. 10-368177

(51) Int. Cl.[7] ............................ G03B 13/18; G03B 17/20
(52) U.S. Cl. ..................................... 396/147; 396/296
(58) Field of Search ....................................... 396/147, 296

(56) References Cited

U.S. PATENT DOCUMENTS

| | | | | |
|---|---|---|---|---|
| 3,094,911 | * | 6/1963 | Reiche et al. | 396/296 |
| 3,687,038 | * | 8/1972 | Kawakami | 396/296 |
| 5,361,119 | * | 11/1994 | Shida et al. | 396/147 |
| 5,473,403 | * | 12/1995 | Suda et al. | 396/147 |
| 5,754,900 | * | 5/1998 | Suda | 396/147 |
| 5,969,869 | | 10/1999 | Hirai et al. | 359/599 |

FOREIGN PATENT DOCUMENTS 3-140930   6/1991   (JP) .
3-192340   8/1991   (JP) .

* cited by examiner

Primary Examiner—W. B. Perkey
(74) Attorney, Agent, or Firm—Greenblum & Bernstein, P.L.C.

(57) ABSTRACT

An indicator provided within a view finder for a single lens reflex camera, includes a pentagonal prism having a roof reflection surface that reflects light emitted from a focusing plate which is located at a position optically equivalent to an imaging plane of a photographic lens of the single lens reflex camera, and a third reflection surface which reflects the light reflected by the roof reflection surface toward an eyepiece, wherein the third reflection surface includes a semitransparent surface. The indicator includes an auxiliary prism adhered to the semitransparent surface; an indicator plate including an information mask; and an illumination light source which emits light through the information mask of the indicator plate, in that order from the opposite side of the auxiliary prism with respect to the third reflection surface thereof; and a diopter correcting lens, which makes the position of the indicator plate optically equivalent to the position of the focusing plate, provided between the auxiliary prism and the indicator plate.

16 Claims, 7 Drawing Sheets

INDICATOR PROVIDED WITHIN FINDER FOR SINGLE LENS REFLEX CAMERA

BACKGROUND OF THE INVENTION

1. Field of the Invention

The present invention relates to an indicator provided within a view finder for a single lens reflex camera, and more precisely, relates to an indicator in which photographing information to be indicated is superimposed on an object image.

2. Description of the Related Art

A superimposing indicator within a finder is known in the art, in which a focusing plate is provided with, for example, deflector elements (reflecting elements) which are illuminated by LEDs. In this type of indicator within a finder, if the number of the deflector elements provided on the focusing plate is increased, it is difficult not only to arrange a number of LEDs in a narrow area at the edge of the focusing plate, but also to precisely make light incident upon a desired deflector element to be illuminated, so as not to undesirably illuminate the surrounding deflector elements which are not intended to be illuminated.

Moreover, there is also known an indicator within a finder in which a focusing plate is a liquid crystal plate, so that photographing information is indicated through the liquid crystal plate. In this type of indicator, however, the indication of the finder is so dark that it is difficult for a viewer to correctly recognize the indication thereof.

In another known indicator in which a half mirror is provided between an eyepiece and a pentagonal prism or a pentagonal mirror of a finder optical system, light emitted from LEDs is split, and is made incident upon the finder optical system through the half mirror. However, there are problems with the fundamental functions of the finder, i.e., the magnification of the finder is decreased, or the eye relief is increased, etc.

SUMMARY OF THE INVENTION

It is an object of the present invention to provide an indicator within a finder for a single lens reflex camera, in which various information is indicated in the finder field-of-view, wherein the information can be clearly and correctly indicated and a viewer (i.e., a user) can easily recognize the indication thereof, without sacrificing the fundamental functions of the finder.

In order to achieve the above mentioned object, there is provided an indicator provided within a view finder for a single lens reflex camera, including a pentagonal prism having a roof reflection surface, the roof reflection surface having two reflection surfaces normal to each other, wherein the roof reflection surface reflects light emitted from a focusing plate which is located at a position optically equivalent to an imaging plane of a photographic lens of the single lens reflex camera, and a third reflection surface which reflects the light reflected by the roof reflection surface toward an eyepiece, wherein the third reflection surface includes a semitransparent surface. The indicator includes an auxiliary prism adhered to the semitransparent surface; an indicator plate including an information mask which lies in a plane substantially perpendicular to the optical axis of the eyepiece; and an illumination light source which emits light through the information mask of the indicator plate, in that order from the opposite side of the auxiliary prism with respect to the third reflection surface thereof; and a diopter correcting lens, which makes the position of the indicator plate optically equivalent to the position of the focusing plate, provided between the auxiliary prism and the indicator plate.

According to another aspect of the present invention, there is provided an indicator provided within a view finder for a single lens reflex camera, including a pentagonal mirror having a roof reflection surface, the roof reflection surface having two reflection surfaces normal to each other, wherein the roof reflection surface reflects light emitted from a focusing plate which is located at a position optically equivalent to an imaging plane of a photographic lens of the single lens reflex camera, and a third reflection surface which reflects the light reflected by the roof reflection surface toward an eyepiece, wherein the third reflection surface includes a semitransparent surface. The indicator includes an indicator plate including an information mask to be indicated within the finder field-of-view and which lies in a plane substantially perpendicular to the optical axis of the eyepiece, and an illumination light source which emits light through the information mask of the indicator plate, in that order from the third reflection surface; and a diopter correcting lens, which makes the position of the indicator plate optically equivalent to the position of the focusing plate, provided between the third reflection surface and the indicator plate.

In regard to the two above described aspects of the present invention, it is preferable that the indicator includes a plurality of the information masks, wherein the illumination light source can selectively emit light so as to correspond to the information masks. Preferably, the information masks define object distance measuring area masks. Preferably, the semitransparent surface of the third reflection surface has a transmittance which permits 5 to 20% of visible light emitted from the illumination light source to pass therethrough.

According to another aspect of the present invention, there is provided an indicator provided within a view finder for a single lens reflex camera, including a pentagonal prism having a roof reflection surface, the roof reflection surface having two reflection surfaces normal to each other, wherein the roof reflection surface reflects light emitted from a focusing plate which is located at a position optically equivalent to an imaging plane of a photographic lens of the single lens reflex camera, and a third reflection surface which reflects the light reflected by the roof reflection surface toward an eyepiece, wherein the third reflection surface includes a semitransparent surface. The indicator includes an auxiliary prism adhered to the semitransparent surface; an LCD panel in which information to be indicated within the finder field-of-view is indicated; a projection lens; and an illumination light source which emits light to illuminate the LCD panel through the projection lens, in that order from the opposite side of the auxiliary prism with respect to the third reflection surface thereof; and a diopter correcting lens, which makes the position of the LCD panel optically equivalent to the position of the focusing plate, provided between the third reflection surface and the LCD panel.

According to another aspect of the present invention, there is provided an indicator provided within a view finder for a single lens reflex camera, including a pentagonal mirror having a roof reflection surface, the roof reflection surface having two reflection surfaces normal to each other, wherein the roof reflection surface reflects light emitted from a focusing plate which is located at a position optically equivalent to an imaging plane of a photographic lens of the single lens reflex camera, and a third reflection surface which reflects the light reflected by the roof reflection surface toward an eyepiece, wherein the third reflection surface defines a semitransparent surface. The indicator includes an LCD panel in which information to be indicated within the finder field-of-view is indicated; a projection lens; and an illumination light source which emits light to illuminate the LCD panel through the projection lens, in that order from the third reflection surface; and a diopter correcting lens, which makes the position of the LCD panel optically equivalent to the position of the focusing plate, provided between the third reflection surface and the LCD panel.

In regard to the two above-described aspects, it is preferable that the projection lens includes a Fresnel lens. Preferably, the projection lens is provided with an aspherical surface. Preferably, the semitransparent surface of the third reflection surface has a transmittance which permits approximately 5% to 20% of visible light emitted from the illumination light source to pass therethrough.

The present disclosure relates to subject matter contained in Japanese Patent Applications Nos. 10-368176 (filed on Dec. 24, 1998) and 10-368177 (filed on Dec. 24, 1998) which are expressly incorporated herein by reference in their entireties.

BRIEF DESCRIPTION OF THE DRAWINGS

The invention will be discussed below in detail with reference to the accompanying drawings, in which.

DESCRIPTION OF THE PREFERRED EMBODIMENTS

FIGS. 1 through 5 show a single lens reflex camera having an indicator within a finder, according to a first embodiment of the present invention. This embodiment is applied to an indicator for indicating a selected object distance measuring area mask in a multi-point distance-measuring single lens reflex camera using a pentagonal prism. Object light transmitted through a photographic lens 11 is reflected by a main mirror 13 and is converged onto a focusing plate 15 which is optically equivalent to a film surface (imaging plane) 17. A pentagonal prism 19 is positioned over the focusing plate 15 and is provided with a roof reflection surface (first and second reflection surfaces normal to each other) 19a and a third reflection surface 19b. The roof reflection surface 19a reflects the object light transmitted through the focusing plate 15 toward the third reflection surface 19b, and the object light reflected by the third reflection surface 19b reaches an eyepiece 21. As is well known in the art, the roof reflection surface 19a and the third reflection surface 19b of the pentagonal prism 19 constitute a reflection surface system together with the main mirror 13, so that a viewer can view an object image as an erect image.

Figure 1:
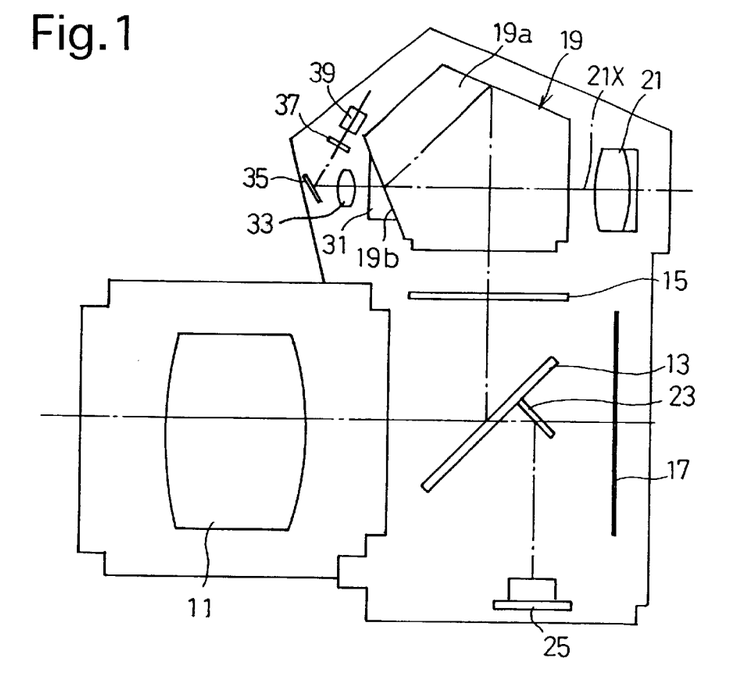
FIG. 1 is a sectional view of the fundamental components of a single lens reflex camera having an indicator within a finder, according to a first embodiment of the present invention.

The main mirror 13 is provided on the center portion thereof with a semitransparent surface (half mirror). The object light transmitted through the half mirror is reflected toward a multi-point distance-measuring AF module 25 by a sub mirror 23. The multi-point distance-measuring AF module 25 measures (calculates) the defocus amount in a plurality of object distance measurement areas within a photographic field-of-view (as viewed through the finder). An AF drive system (not shown) drives the photographic lens 11 in accordance with the detected defocus amount signal, so that the photographic lens 11 is focused on an object within a selected distance-measurement area. The above-mentioned structure is a conventional multi-point distance-measuring single lens reflex camera known in the art.

Figure 2:
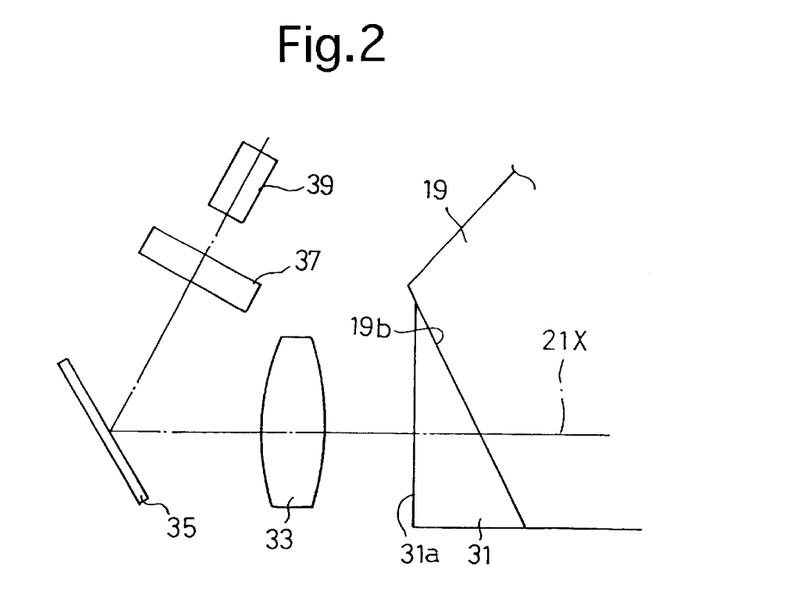
FIG. 2 is an enlarged view of the fundamental components of FIG. 1.
Figure 3:
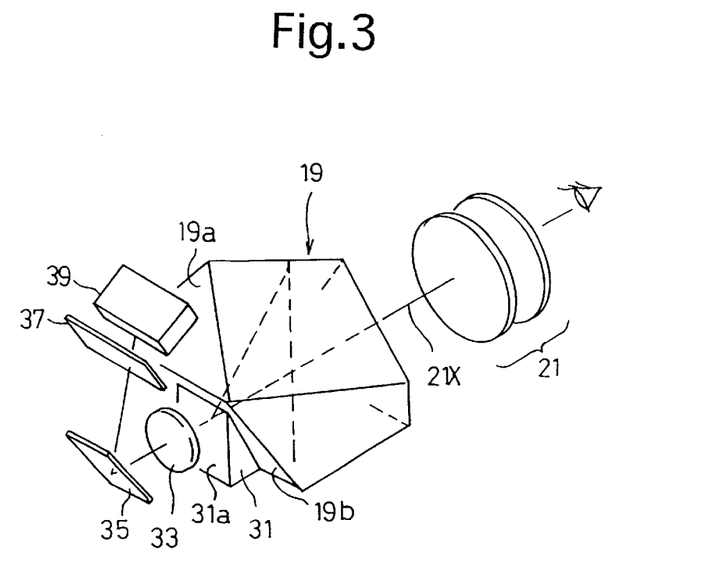
FIG. 3 is a perspective view of the fundamental components of FIG. 1.

In the structure mentioned above, the third reflection surface 19b of the pentagonal prism 19 is provided in a predetermined area with a semitransparent surface (half mirror), the center axis thereof being identical to the optical axis 21x of the eyepiece 21. An auxiliary prism 31 is cemented to the semitransparent surface of the third reflection surface 19b. The auxiliary prism 31 is constructed from the same material as the pentagonal prism 19 so that the optical axis 21x of the eyepiece 21 is not deflected at the cemented surface therebetween, and is provided with an emission surface 31a which is perpendicular to the optical axis 21x of the eyepiece 21, so that the object light is not deflected (travels linearly).

A diopter correcting lens 33, a reflection mirror 35, an indication plate 37, and an illumination light source 39 are provided outside the auxiliary prism 31 in that order along the optical axis 21x of the eyepiece 21. Namely, the optical axis of the eyepiece 21 (optical axis 21x) is substantially identical to the superimposed optical axis (optical axis of the diopter correcting lens 33). The diopter correcting lens 33 having a positive power makes the position of the indicator plate 37 optically equivalent to the focusing plate 15. In an alternative, it is possible to provide the whole, or a part of, the diopter correcting lens 33 on the emission surface of the auxiliary prism 31.

Figure 4:
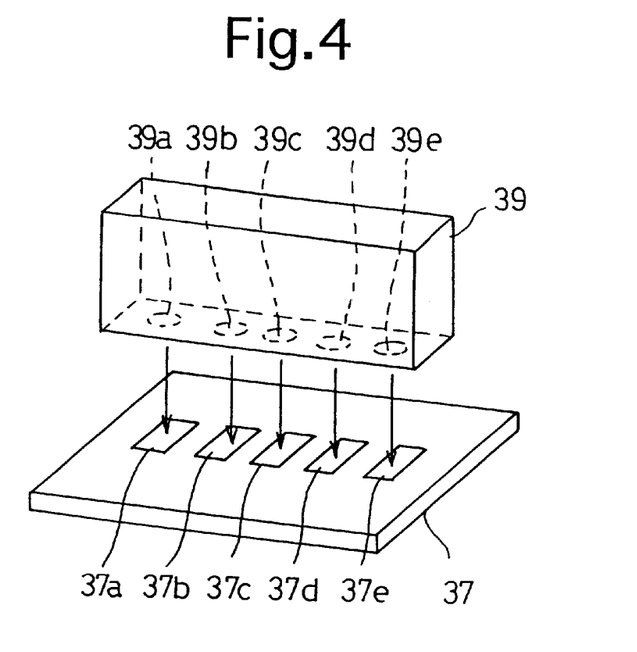
FIG. 4 is a perspective view of an indicator plate having an information mask and an illumination light source, by way of example.

The indicator plate 37 lies in a plane perpendicular to the optical axis 21x. In the illustrated embodiment, as can be seen in FIG. 4, the indicator plate 37 is provided with five distance measuring area masks (information masks) 37a, 37b, 37c, 37d, and 37e for multi-point distance-measurement (i.e., five-point distance-measurement in the illustrated embodiment). The illumination light source 39 includes five LEDs 39a, 39b, 39c, 39d, and 39e corresponding to the five distance-measuring area masks, which can be selectively turned ON to emit light. The distance-measuring area masks 37a through 37e define a transparent area, and the remaining portion of the indicator plate 37 defines a non-transparent (opaque) area.

Figure 5:
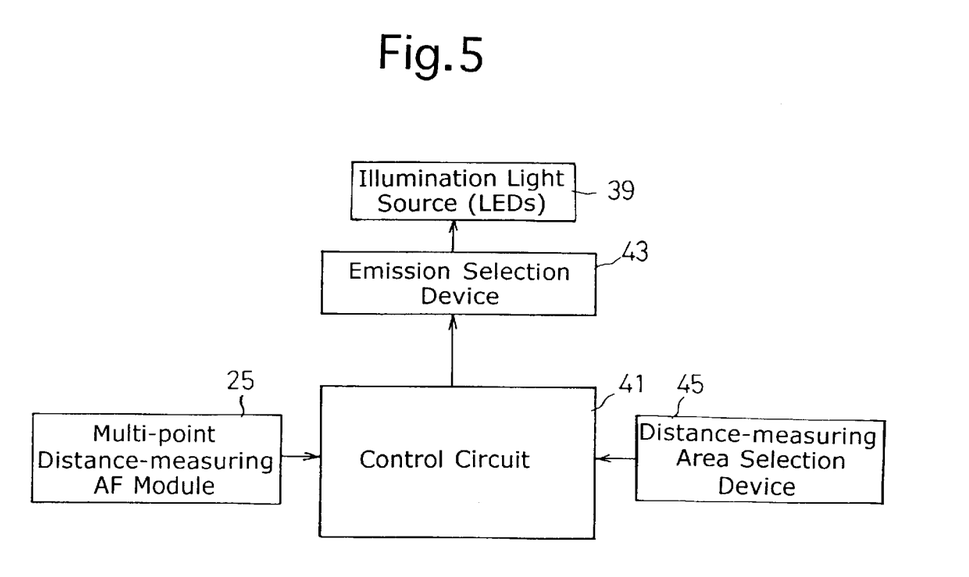
FIG. 5 is a block diagram of a control system of a camera shown in FIG. 1.

The LEDs 39a through 39e of the illumination light source 39 are selectively turned ON to emit light via a control circuit 41 and an emission selection device 43, as can be seen in FIG. 5. The control circuit 41 receives data supplied from a distance-measuring area selection device 45 which selects the object distance measuring area to be used from among five distance-measuring areas, and distance data (defocus data) supplied from the multi-point distance-measuring AF module 25. The control circuit 41 causes one of the LEDs 39a, 39b, 39c, 39d and 39e, corresponding to one of the selected distance-measuring area masks 37a, 37b, 37c, 37d and 37e, to emit light via the emission selection device 43 in accordance with the input distance data. The rays of light emitted from the LEDs 39a through 39e are transmitted through the corresponding distance-measuring area masks 37a through 37e, and are reflected by the reflection mirror 35 to enter the pentagonal prism 19 through the diopter correcting lens 33 and the auxiliary prism 31. Consequently, the rays of light emitted from the LEDs 39a through 39e can be viewed through the eyepiece 21 together with an object image formed on the focusing plate 15. Since the rays of light emitted from the LEDs 39a through 39e emit light through the distance-measuring are masks 37a through 37e, the emitted light rays are indicated as information within the finder field-of-view. The distance-measuring area selection device 45 can be embodied as a manual switch or a line-of-sight detection switch, etc. In FIG. 5, a drive system for driving the photographic lens 11, which is driven based on the distance data (defocus data) supplied from the multi-point distance-measuring AF module 25 is omitted.

Figure 7:
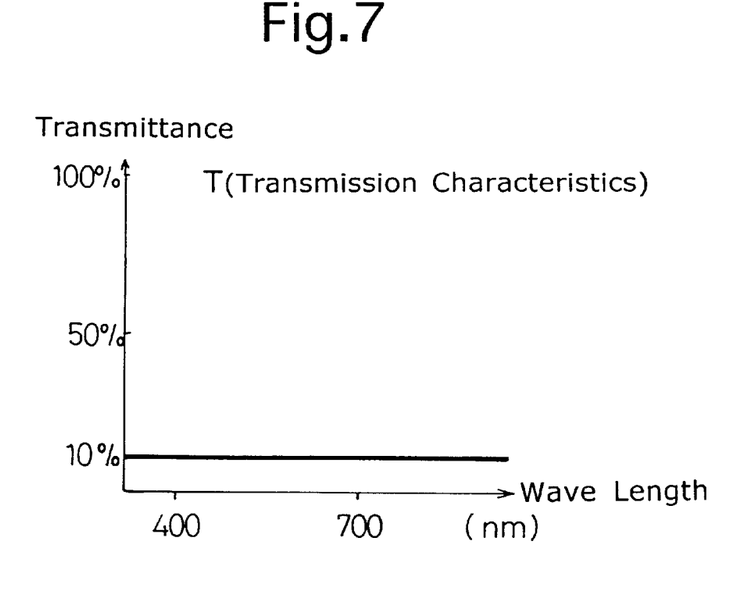
FIG. 7 is a graph showing an example of a transmittance of a semitransparent surface of a third reflection surface.
Figure 8:
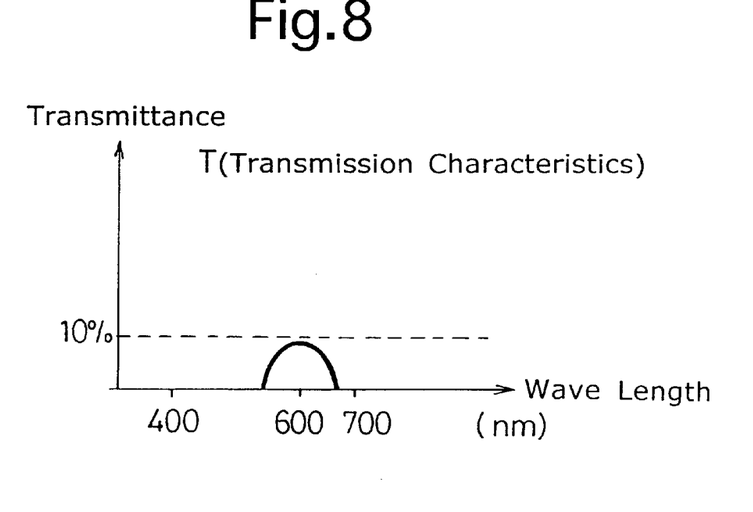
FIG. 8 is a graph showing another example of a transmittance of a semitransparent surface of a third reflection surface.

The color of light emitted from the light source 39 is visible when it is superimposed on the object image formed on the focusing plate 15, and can be red, for example (wavelength: approximately 600 nm). The transmission characteristics of the semitransparent film formed on the third reflection surface 19b are such that the light of the LEDs passing through the distance measuring area masks 37a through 37e which is directly incident on the viewer's eye is not obstructive, but can be clearly recognized. It has been confirmed through experimentation that it is preferable for the half mirror coating on the surface 19b to have a transmittance of approximately 5% to 20%, and more preferably a transmittance of about 10%, wherein the light passing therethrough has, for example, a wavelength of approximately 600 nm. The transmission characteristics can be obtained by a coating which exhibits a uniform transmittance over the entire visible light wavelength band, as shown in FIG. 7, or by a coating which permits approximately 10% of light (i.e., only the wavelength band of approximately 600 nm) to pass therethrough, and prevents the remaining wavelengths of light from passing therethrough, as shown in FIG. 8. Such coating technology is known in the art.

It is possible to provide light interception walls between the indicator plate 37 and the illumination light source 39 to prevent the light emitted from any one of the LEDs 39a through 39e from entering the distance-measuring area masks 37a through 37e other than the distance-measuring area mask corresponding to the selected LED.

The reduced light path length of the indicating optical system between the eyepiece 21 and the indicator plate 37 is decreased by an amount corresponding to the light path length of the pentagonal prism 19 and the auxiliary prism 31 having a refractive index more than 1; and hence, the power of the diopter correcting lens 33 can be reduced. Moreover, the diopter correcting lens 33 makes it possible not only to correct the diopter of the finder while reducing the whole length of the indicating optical system, but also to make the indicator plate 37 smaller than the focusing plate 15, thus miniaturizing the indicating optical system.

Figure 6:
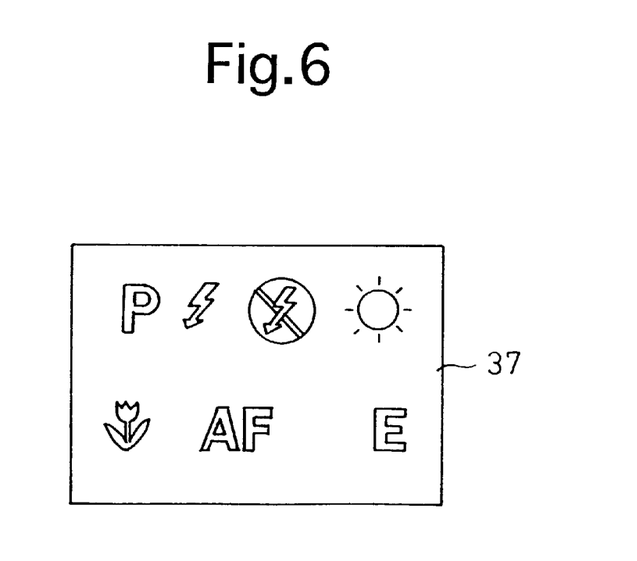
FIG. 6 is a plan view of another example of an information mask.

FIG. 6 shows another example of the information masks provided on the indicator plate 37. In FIG. 6, upper masks for a program mode, a strobe mode, a strobe prohibition mode, and a back light mode, in that order from left to right; and lower masks for a macro-photographing mode, an AF mode, and an automatic exposure mode, in that order from left to right are shown, by way of example.

FIGS. 9 through 13 show a second embodiment of the present invention, applied to a single lens reflex camera having an indicator within a finder.

In the first embodiment, the information masks are used for indicating information within the finder field-of-view, whereas, in the second embodiment, an LCD panel is used as the information indication device. The remaining structure of the second embodiment is substantially the same as that of the first embodiment, and hence, the elements corresponding to those in the first embodiment are designated with the same reference numbers. The following discussion will be addressed only to different aspects between the first and second embodiments.

Figure 9:
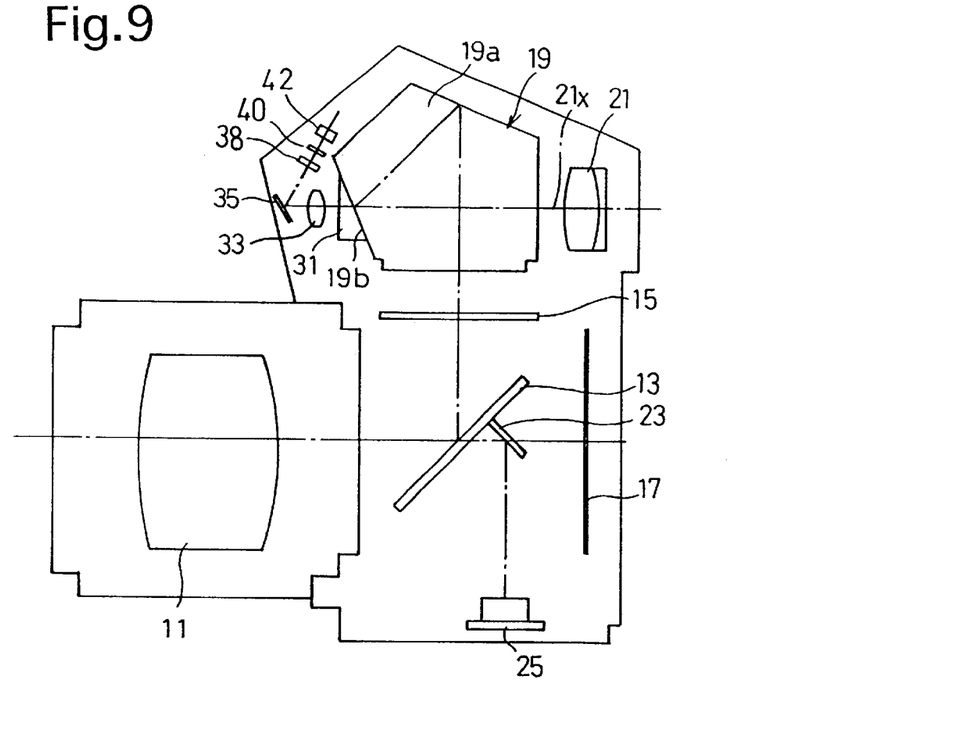
FIG. 9 is a sectional view of the fundamental components of a single lens reflex camera having an indicator within a finder, according to a second embodiment of the present invention.
Figure 10:
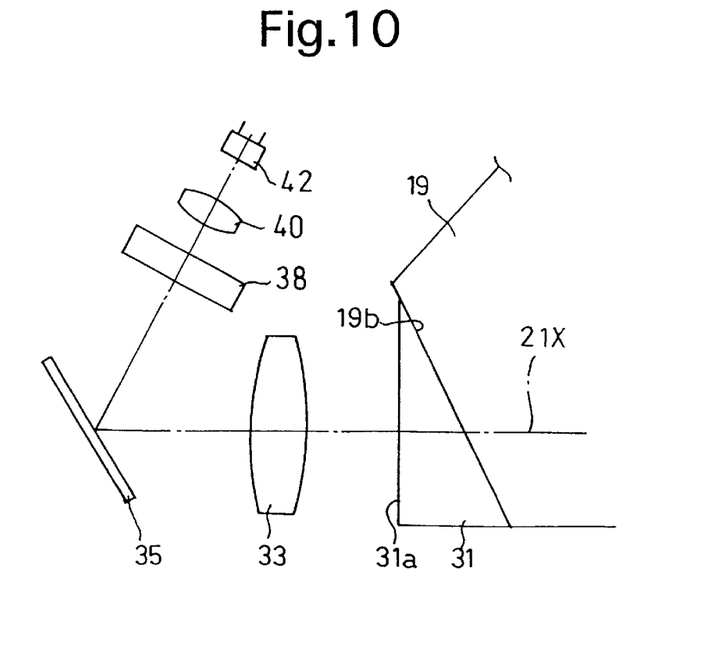
FIG. 10 is an enlarged view of the fundamental components of FIG. 9.
Figure 11:
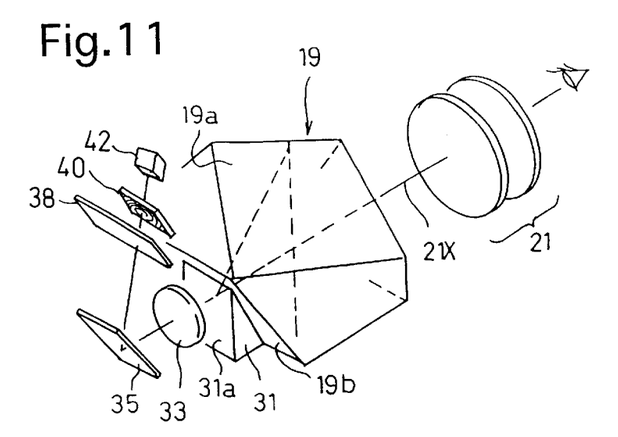
FIG. 11 is a perspective view of the fundamental components of FIG. 9.

A diopter correcting lens 33, a reflection mirror 35, an LCD panel 38, a projection lens 40 and an illumination light source 42 are arranged in this order on the optical axis 21x outside the auxiliary prism 31. Namely, the optical axis of the eyepiece 21 (optical axis 21x) is substantially identical to the superimposed optical axis (i.e., the optical axis of the diopter correcting lens 33). The diopter correcting lens 33, having a positive optical power, makes the position of the LCD panel 38 optically equivalent to the focusing plate 15. It is possible to provide the whole, or a part of, the diopter correcting lens 33 on the emission surface of the auxiliary prism 31.

Figure 12:
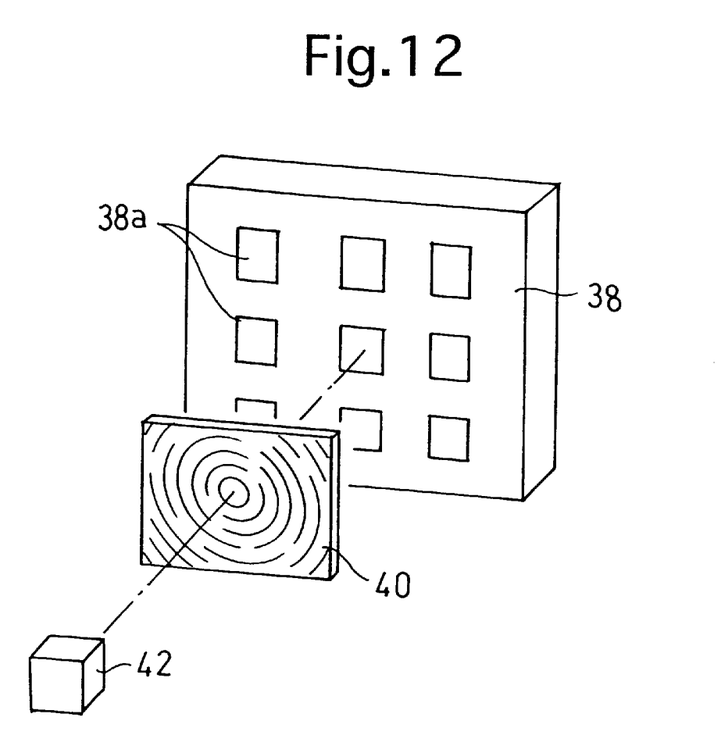
FIG. 12 is a perspective view of an LCD panel having an information mask and an illumination light source, by way of example.

The LCD panel 38 lies in a plane perpendicular to the optical axis 21x. In the illustrated embodiment, as can be seen in FIG. 12, the LCD panel 38 is provided with nine distance measuring area masks (information masks) 38a in the form of a matrix of 3×3 in order to carry out a multi-point distance-measurement (i.e., nine-point distance-measurement in the illustrated embodiment). The distance-measuring area masks 38a are each provided with a liquid crystal enclosed therein, which is normally opaque (non-transparent) and changes to a transparent state when a drive voltage is applied thereto. The illumination light source (LED) 42 illuminates the LCD panel 38 via the projection lens 40. The projection lens 40 collimates the divergent light emitted from the light source 42 so that substantially parallel light is incident upon the LCD panel 38. Consequently, the light of the light source 42 transmitted through any of distance-measuring area masks 38a, which is turned into a transparent state, can reach the viewer's eye via the reflection mirror 35, the auxiliary prism 31, the pentagonal prism 19 and the eyepiece 21.

FIG. 12 shows a projection lens 40 constructed as a Fresnel lens. It is possible to provide at least one aspherical surface on the projection lens 40 to provide a uniform light distribution.

Figure 13:
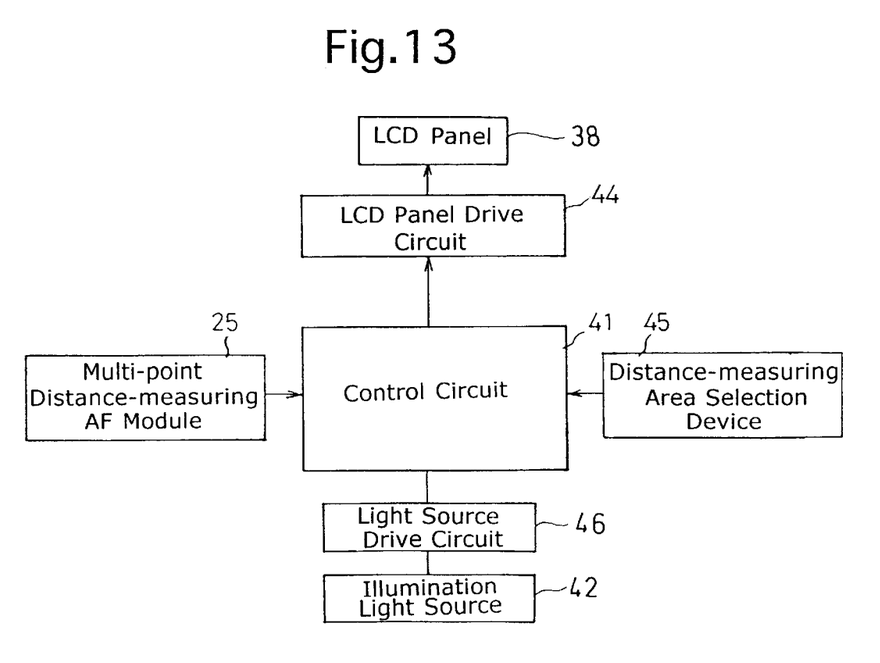
FIG. 13 is a block diagram of a control system of a camera shown in FIG. 9.

The illumination light source 42 emits light via the control circuit 41 and the light source drive circuit 46, as shown in FIG. 13. The LCD panel 38 is driven via the control circuit 41 and an LCD panel drive circuit 44. The control circuit 41 receives data supplied from a distance-measuring area selection device 45 which selects the object distance measuring area to be used from among the nine distance-measuring areas, and distance data (defocus data) supplied from the multi-point distance-measuring AF module 25. The control circuit 41 supplies the voltage to the liquid crystal corresponding to the selected distance-measuring area mask 38a via the LCD panel drive circuit 44 in accordance with the input data, so that the illumination light source emits light through the light source drive circuit 46. The light emitted from the illumination light source 42 is transmitted through the distance-measuring area mask 38a which has been turned into a transparent state, and is reflected by the reflection mirror 35 to enter the pentagonal prism 19 through the diopter correcting lens 33 and the auxiliary prism 31. Consequently, the light emitted from the illumination light source 42 can be viewed through the eyepiece 21 together with an object image formed on the focusing plate 15. Since the rays of light emitted from the illumination light source 42 are transmitted through the distance-measuring area masks 38a, the emitted light rays are indicated as information within the finder field-of-view. The distance-measuring area selection device 45 can be embodied by a manual switch or a line-of-sight detection switch, etc. In FIG. 13, a drive system for driving the photographic lens 11, which is driven based on the distance data (defocus data) supplied from the multi-point distance-measuring AF module 25 is omitted.

Similar to the first embodiment, the color of light emitted from the light source 42 is one which is visible when superimposed on the object image formed on the focusing plate 15, and can be red for example (wavelength: approximately 600 nm). The transmission characteristics of the semitransparent film formed on the third reflection surface 19b is such that the light of the LEDs passing through the distance measuring area masks 38a which is directly incident on the viewer's eye is not obstructive, but can be clearly recognized. It has been confirmed through experimentation that it is preferable for the half mirror coating on the surface 19b to have a transmittance of approximately 5% to 20%, and more preferably a transmittance of about 10%, wherein the light passing therethrough has, for example, a wavelength of approximately 600 nm. The transmission characteristics can be obtained by a coating which exhibits a uniform transmittance over the entire visible light wavelength band, as shown in FIG. 7, or by a coating which permits approximately 10% of light (i.e., only the wavelength band of approximately 600 nm) to pass therethrough, and prevents the remaining wavelengths of light from passing therethrough, as shown in FIG. 8. Such coating technology is known in the art.

The reduced light path length of the indicating optical system between the eyepiece 21 and the LCD panel 38 is decreased by an amount corresponding to the light path length of the pentagonal prism 19 and the auxiliary prism 31 having a refractive index more than 1; and hence, the power of the diopter correcting lens 33 can be reduced. Moreover, the diopter correcting lens 33 makes it possible not only to correct the diopter of the finder while reducing the whole length of the indicating optical system, but also to make the LCD panel 38 smaller than the focusing plate 15, thus miniaturizing the indicating optical system.

It is possible to provide information masks, for example, as shown in FIG. 6 on the LCD panel 38, as in the first embodiment.

Alternatively, in the present invention, it is possible to use a pentagonal mirror (i.e., a hollow mirror having reflection surfaces corresponding to the roof reflection surface 19a and the third reflection surface 19b of the pentagonal prism 19) in place of the pentagonal prism 19. In this alternative, the auxiliary prism 31 can be omitted.

As can be understood from the foregoing, according to the present invention, not only can necessary information be clearly and correctly indicated within the field of the view of the finder without having an adverse influence on the fundamental functions of the view finder of a single lens reflex camera, but also a small indicator within a view finder can be provided. In particular, the present invention can be advantageously applied to a superimposed indicator, in which information is superimposed on an object image within the finder.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An indicator provided within a view finder for a single lens reflex camera, comprising:

a pentagonal prism having a roof reflection surface, said roof reflection surface having two reflection surfaces normal to each other, wherein said roof reflection surface reflects light emitted from a focusing plate which is located at a position optically equivalent to an imaging plane of a photographic lens of said single lens reflex camera, and a third reflection surface which reflects said light reflected by said roof reflection surface toward an eyepiece, wherein said third reflection surface comprises a semitransparent surface;

an auxiliary prism adhered to said semitransparent surface; an indicator plate comprising an information mask which lies in a plane substantially perpendicular to the optical axis of said eyepiece; and an illumination light source which emits light through said information mask of said indicator plate, in that order from the opposite side of the auxiliary prism with respect to the third reflection surface thereof; and a diopter correcting lens, adapted to make the position of said indicator plate optically equivalent to the position of said focusing plate, provided between the auxiliary prism and the indicator plate.

2. The indicator provided within a view finder for a single lens reflex camera according to claim 1, wherein said indicator comprises a plurality of said information masks, said illumination light source adapted to selectively emit light so as to correspond to said information masks.

3. The indicator provided within a view finder for a single lens reflex camera according to claim 2, wherein said information masks define object distance measuring area masks.

4. The indicator provided within a view finder for a single lens reflex camera according to claim 1, wherein said semitransparent surface of said third reflection surface has a transmittance which permits approximately 5% to 20% of visible light emitted from the illumination light source to pass through said semitransparent surface.

5. An indicator provided within a view finder for a single lens reflex camera, comprising:

a pentagonal mirror having a roof reflection surface, said roof reflection surface having two reflection surfaces normal to each other, wherein said roof reflection surface reflects light emitted from a focusing plate which is located at a position optically equivalent to an imaging plane of a photographic lens of said single lens reflex camera, and a third reflection surface which reflects said light reflected by said roof reflection surface toward an eyepiece, wherein said third reflection surface comprises a semitransparent surface;

an indicator plate comprising an information mask to be indicated within the finder field-of-view and which lies in a plane substantially perpendicular to the optical axis of the eyepiece, and an illumination light source which emits light through said information mask of the indicator plate, in that order from the third reflection surface; and a diopter correcting lens, adapted to make the position of said indicator plate optically equivalent to the position of said focusing plate, provided between the third reflection surface and the indicator plate.

6. The indicator provided within a view finder for a single lens reflex camera according to claim 5, wherein said indicator comprises a plurality of said information masks, said illumination light source adapted to selectively emit light so as to correspond to said information masks.

7. The indicator provided within a view finder for a single lens reflex camera, according to claim 6, wherein said information masks define object distance measuring area masks.

8. The indicator provided within a view finder for a single lens reflex camera according to claim 5, wherein said semitransparent surface of said third reflection surface has a transmittance which permits approximately 5% to 20% of visible light emitted from the illumination light source to pass through said semitransparent surface.

9. An indicator provided within a view finder for a single lens reflex camera, comprising:

a pentagonal prism having a roof reflection surface, said roof reflection surface having two reflection surfaces normal to each other, wherein said roof reflection surface reflects light emitted from a focusing plate which is located at a position optically equivalent to an imaging plane of a photographic lens of said single lens reflex camera, and a third reflection surface which reflects said light reflected by said roof reflection surface toward an eyepiece, wherein said third reflection surface comprises a semitransparent surface;

an auxiliary prism adhered to said semitransparent surface; an LCD panel in which information to be indicated within the finder field-of-view is indicated; a projection lens; and an illumination light source which emits light to illuminate the LCD panel through the projection lens, in that order from the opposite side of the auxiliary prism with respect to the third reflection surface thereof; and a diopter correcting lens, adapted to make the position of said LCD panel optically equivalent to the position of said focusing plate, provided between the third reflection surface and the LCD panel.

10. The indicator provided within a view finder for a single lens reflex camera according to claim 9, wherein said projection lens comprises a Fresnel lens.

11. The indicator provided within a view finder for a single lens reflex camera according to claim 9, wherein said projection lens is provided with an aspherical surface.

12. The indicator provided within a view finder for a single lens reflex camera, according to claim 9, wherein said semitransparent surface of the third reflection surface has a transmittance which permits approximately 5% to 20% of visible light emitted from the illumination light source to pass through said semitransparent surface.

13. An indicator provided within a view finder for a single lens reflex camera, comprising:

a pentagonal mirror having a roof reflection surface, said roof reflection surface having two reflection surfaces normal to each other, wherein said roof reflection surface reflects light emitted from a focusing plate which is located at a position optically equivalent to an imaging plane of a photographic lens of said single lens reflex camera, and a third reflection surface which reflects said light reflected by said roof reflection surface toward an eyepiece, wherein said third reflection surface defines a semitransparent surface;

an LCD panel in which information to be indicated within the finder field-of-view is indicated; a projection lens; and an illumination light source which emits light to illuminate the LCD panel through the projection lens, in that order from the third reflection surface; and a diopter correcting lens, adapted to make the position of said LCD panel optically equivalent to the position of said focusing plate, provided between the third reflection surface and the LCD panel.

14. An indicator provided within a view finder for a single lens reflex camera, according to claim 13, wherein said projection lens comprises a Fresnel lens.

15. An indicator provided within a view finder for a single lens reflex camera, according to claim 13, wherein said projection lens is provided with an aspherical surface.

16. An indicator provided within a view finder for a single lens reflex camera, according to claim 13, wherein said semitransparent surface of the third reflection surface has a transmittance which permits 5% to 20% of visible light emitted from the illumination light source to pass through said semitransparent surface.

* * * * *